United States Patent
Fetterman et al.

(10) Patent No.: US 10,054,672 B2
(45) Date of Patent: Aug. 21, 2018

(54) APPARATUS AND METHOD FOR DETECTING AND CORRECTING FOR BLOCKAGE OF AN AUTOMOTIVE RADAR SENSOR

(71) Applicant: Veoneer US, Inc., Southfield, MI (US)

(72) Inventors: Matthew Fetterman, Waltham, MA (US); Jonathan Preussner, Wayland, MA (US); Aret Carlsen, Groton, MA (US)

(73) Assignee: Veoneer US, Inc., Southfield, MI (US)

( * ) Notice: Subject to any disclaimer, the term of this patent is extended or adjusted under 35 U.S.C. 154(b) by 198 days.

(21) Appl. No.: 14/840,902

(22) Filed: Aug. 31, 2015

(65) Prior Publication Data
US 2017/0059695 A1    Mar. 2, 2017

(51) Int. Cl.
| | | |
|---|---|---|
| G01S 13/93 | (2006.01) | |
| G01S 7/40 | (2006.01) | |
| G01S 13/58 | (2006.01) | |
| G01S 13/72 | (2006.01) | |

(52) U.S. Cl.
CPC .......... *G01S 7/4026* (2013.01); *G01S 13/582* (2013.01); *G01S 13/584* (2013.01); *G01S 13/726* (2013.01); *G01S 13/931* (2013.01); *G01S 2007/4039* (2013.01); *G01S 2013/9353* (2013.01); *G01S 2013/9375* (2013.01)

(58) Field of Classification Search
CPC ............................ G01S 7/4026; G01S 13/582
USPC ..................................................... 342/70–72
See application file for complete search history.

(56) References Cited

U.S. PATENT DOCUMENTS

| | | | | |
|---|---|---|---|---|
| 5,959,570 | A | * | 9/1999 | Russell ................. G01S 13/003 342/70 |
| 6,124,823 | A | | 9/2000 | Tokoro |
| 6,469,659 | B1 | | 10/2002 | Lajiness et al. |
| 6,611,227 | B1 | * | 8/2003 | Nebiyeloul-Kifle .. G01S 7/4004 180/167 |
| 7,218,208 | B2 | | 5/2007 | Kikuchi |
| 2002/0163463 | A1 | * | 11/2002 | Lajiness ................ G01S 7/4004 342/70 |

(Continued)

FOREIGN PATENT DOCUMENTS

| | | |
|---|---|---|
| DE | 102005013146 | 9/2006 |
| EP | 2546676 | 1/2013 |

OTHER PUBLICATIONS

Search Report and Written Opinion dated Oct. 21, 2016 in corresponding PCT Application No. PCT/US2016/043314, filed Jul. 21, 2016.

*Primary Examiner* — Marcus E Windrich
(74) *Attorney, Agent, or Firm* — Burns & Levinson, LLP; Steven M. Mills

(57) ABSTRACT

An automotive radar system and method transmit a plurality of radar signals into a region, detect reflected radar signals, and convert the reflected radar signals into digital data signals. A plurality of range-Doppler maps for the region are generated from the digital data signals, and the plurality of range-Doppler maps are averaged to generate an averaged range-Doppler map for the region. Data points in the averaged range-Doppler map are analyzed to detect blobs in the averaged range Doppler map. If a blob is detected in the averaged range-Doppler map, the radar detector is indicated to be unblocked.

24 Claims, 14 Drawing Sheets

(56) References Cited

U.S. PATENT DOCUMENTS

| | | | | |
|---|---|---|---|---|
| 2005/0192769 A1* | 9/2005 | von Reyher | .......... | G01S 7/4802 |
| | | | | 702/104 |
| 2009/0243912 A1* | 10/2009 | Lohmeier | ............. | G01S 7/4004 |
| | | | | 342/70 |
| 2010/0073218 A1* | 3/2010 | Stockmann | ........... | G01S 7/2923 |
| | | | | 342/146 |
| 2013/0015999 A1* | 1/2013 | Alland | .................. | G01S 7/4026 |
| | | | | 342/70 |

* cited by examiner

```
Function SumRDMap = ComputeSumRDMap (ThisRDMap )
    // Each cycle this function adds the currentRDMap to the sum RD map
    // set certain regions to 0: range bins 1-5, range bins 1-50 & Doppler 1-5, range bins 1-50 and Doppler 59-63. To avoid fascia
reflection
    // this function takes about 3ms per cycle which should not be a problem. Timing will not depend on particular RD Map.      Compute
        SumRDMap = SumRDMap + abs( ThisRDMap )                                                                                  Summed
                                                                                                                                RD Map
```

*Fig. 9A*

```
Function  NormalizedRDMap =ComputeNormalizedRDMap( SumRDMap )                                              Normalize RD
    // this function normalizes each row of RD map by dividing by median of that row                       Map
    // remove effects of range
    // timing considerations:
    // this function is spread over 8 cycles, and expect timing to be repeatable irrespective of particular RD Map
    // set LastRange=0 initially in Init, ReInit
    StartRange = LastRange
    EndRange = StartRange + Delta
    FOR rangeIndex =StartRange : EndRange
        x= SumRDMap ( rangeIndex == count )
        x=x/median(x)
        NormalizedRDMap (rangeIndex ==count) = x
```

```
Function ComputeSMMetric( NormalizedRDMap )
    // compute SM metric based on NormalizedRDMap
    // this function relies on BlobDetection
    // step through range bins line by line
    // after each range bin check to see if we have exceeded the threshold to declare clear, or whether we have exceeded the
    // allowed time per cycle and we should jump to another cycle
    // set KeepGoing =TRUE and rangeIndex =0 in Init, ReInit
    DO
        FOR (DopplerIndex =1: NumDopplerBins )
            // consider each point in this line and see if it is part of a blob
            // TemporaryList is a list of selected points in the blob
            TemporaryList= SearchForBlob( rangeIndex ,DopplerIndex)
            // blobs are accepted if they have at least ThreshPoints points in the blob
            IF NumPoints in TemporaryList > ThreshPoints,
                // if the blob is OK, we sum the values of the points in the blob and add it to the metric
                // AlreadyChosen denotes points that have been chosen to be part of the blob (Already chosen is a matrix)
                UpdateSMMetric (TemporaryList)
                AlreadyChosen (TemporaryList) =1
        rangeIndex ++
        // if KeepGoing==FALSE we are done with the loop...if ElapsedTime >AllowedTimePerCycle , continue computation on next cycle
        KeepGoing= rangeIndex <MaxRange & & SMMetric < SMMetricThreshold & TAPOUT==0
    WHILE (KeepGoing==TRUE & ElapsedTime < AllowedTimePerCycle)
```

[Compute SM Metric using Blob Detection on Normalized RD Map]

Note. If we are in State0 (moving slowly) only search in the low-speed regions of the RD map. (DopplerBin<6 or DopplerBin>58).

```
Function TemporaryList = SearchForBlob (rangeIndex ,DopplerIndex)
    // Figure out whether the point in the RD Map denoted by (rangeIndex, DopplerIndex) is the Seed Point of a blob
    // if it is a seedpoint, then lets track down the entire blob
    GoodPoint=1                                                    ┌─────────────────────────────┐
    // Initialize TemporaryBlob matrix and TemporaryList, list of points in blob  │ Determine whether input     │
    TemporaryBlob=0, TemporaryList=0                               │ point is a SeedPoint. If so,│
    // Note aThresh and NumNeighborsThresh can vary depending on State0 or State1 │ send it to CheckNeighbors   │
    IF NormalizedRDMap (rangeIndex ,DopplerIndex) < aThresh        │ to find the corresponding   │
        GoodPoint =0                                               │ blob                        │
    ELSEIF CountNeighbors (rangeIndex,DopplerIndex) < NumNeighborsThresh └─────────────────────────────┘
        GoodPoint =0
    ELSEIF ( AlreadyChosen ( rangeIndex, DopplerIndex) ==1 OR TemporaryBlob ( rangeIndex, DopplerIndex) == 1  )
        GoodPoint==0
    IF GoodPoint==0
        RETURN 0
    ELSE
        NumBlobPoints=1
        Add (rangeIndex, DopplerIndex) to TemporaryBlob and to TemporaryList
        TemporaryList =CheckNeighbors( rangeIndex , DopplerIndex)
        RETURN TemporaryList
```

Note.
• The calls to CountNeighbors and CheckNeighbors will have parameters depending on whether we are in State0 or State1
• In this function the call to CountNeighbors will be made using parameters for SeedPoint

*Fig. 11*

```
Function NumNeighbors = CountNeighbors (rangeIndex, DopplerIndex,params )
// count the number of surrounding neighbors associated with given point
// note that params will include Delta and bThresh
// depending on whether caller is a SeedPoint or NeighborPoint, and State0 or State1
NumNeighbors= 0
FOR rangeIndex=-Delta: Delta
    FOR DopplerIndex=-Delta: Delta
        IF NormalizedRDMap( rangeIndex, DopplerIndex )> bThresh
            NumNeighbors++
```

> Count number of neighbors that surround the input point and satisfy the threshold criteria Note.
- The version of CheckNeighbors shown here is recursive but we modified it to be non-recursive, to comply with MISRA standards which do not permit recursion

*Fig. 12A*

```
Function CheckNeighbors (rangeIndex, DopplerIndex, params )
   // check neighbors of input point to see whether any neighbors should be added to the blob
   NumNeighbors =0
   // if we have chosen over 30 blob points, stop going, that's enough to declare CLEAR state
   IF NumBlobPoints> ThreshNumBlobPoints
      KeepGoing =FALSE
   IF ElapsedTime> AllowedBlobTime
      KeepGoing =FALSE
      TAPOUT =TRUE
   IF KeepGoing
      FOR Index1=-Delta: Delta
         FOR Index2=-Delta: Delta
            thisRangeIndex =rangeIndex+Index1;
            thisDopplerIndex =DopplerIndex+Index2
            thisNumNeighbors =CountNeighbors (thisRangeIndex , thisDopplerIndex ,params )
            if thisNumNeighbors > NumNeighborsThresh & NormalizedRDMap(thisRangeIndex , thisDopplerIndex )> bThresh
               add this point to TemporaryBlob, TemporaryBlobList
               NumBlobPoints++
               CheckNeighbors (thisRangeIndex , thisDopplerIndex )
```

┌─────────────────────────────┐
│ Check neighbors of input    │
│ point to see whether they   │
│ should be added to the blob │
└─────────────────────────────┘

Note.
• The version of CheckNeighbors shown here is recursive but we modified it to be non-recursive, to comply with MISRA standards which do not permit recursion

*Fig. 12B*

```
Function Metric= UpdateMetric (TemporaryList)
  // add the value of points in TemporaryList to the metric
  for points in TemporaryList
    SMMetric=SMMetric+NormalizedRDMap(points)
```
⌐ ─ ─ ─ ─ ─ ─ ─ ─ ─ ─ ┐
│ Add value of blob points │
│ to SMMetric              │
└ ─ ─ ─ ─ ─ ─ ─ ─ ─ ─ ┘

*Fig. 13A*

```
Function SensorHistory =ComputeSensorState_ShortTime (SMMetric)
  IF SMMetric> SMMetric_Thresh
    Clear=1
  ELSE
    Clear=0
```
⌐ ─ ─ ─ ─ ─ ─ ─ ─ ─ ─ ┐
│ Determine whether this   │
│ computation yielded      │
│ clear or blocked         │
└ ─ ─ ─ ─ ─ ─ ─ ─ ─ ─ ┘

*Fig. 13B*

```
Function SensorState = ComputeSensorState (SensorHistory )
  IF 5/10 of last computations are BLOCKED
    declare BLOCKED
  ELSE
    declare CLEAR
```
⌐ ─ ─ ─ ─ ─ ─ ─ ─ ─ ─ ┐
│ Determine whether to     │
│ declare sensor           │
│ BLOCKED or CLEAR         │
└ ─ ─ ─ ─ ─ ─ ─ ─ ─ ─ ┘

*Fig. 13C*

APPARATUS AND METHOD FOR DETECTING AND CORRECTING FOR BLOCKAGE OF AN AUTOMOTIVE RADAR SENSOR

BACKGROUND

1. Technical Field

The present disclosure is related to automotive radar systems and, in particular, to an apparatus and method for detecting and correcting for blockage of an automotive radar sensor.

2. Discussion of Related Art

In automotive radar systems, it is desirable to detect when the radar sensor is blocked by debris, such as dirt, snow, ice, etc. Sensor blockage or radar blockage attenuates the transmitted and received signal such that objects in the field of view are no longer detectable. It is also important to alert the driver when the sensor is blocked so that the driver does not rely on the radar system while a sensor is blocked, and so that the driver can intervene and clear the debris from the sensor to restore performance of the system.

Declaring a sensor blockage based on the absence of radar signal processing detections is a relatively straightforward means of determining sensor blockage with minimal additional processing time or resources. One drawback of this approach is that it is difficult to distinguish the blocked case from the case in which there are relatively few or no objects large enough to create detections in the field of view of a sensor that is not blocked and is functioning properly. This situation can occur, for example, when the automobile in which the system is operating is passing through a desert.

SUMMARY

According to one aspect, an automotive radar system is provided. The system includes a radar transmitter for transmitting a plurality of radar signals into a region and a radar detector for detecting reflected radar signals and converting the reflected radar signals into digital data signals. A processor receives the digital data signals, generates a plurality of range-Doppler maps for the region and averages the plurality of range-Doppler maps to generate an averaged range-Doppler map for the region. A blob detector analyzes data points in the averaged range-Doppler map to detect blobs in the averaged range Doppler map. If a blob is detected in the averaged range-Doppler map by the blob detector, the radar detector is indicated by the blob detector to be unblocked.

In some exemplary embodiments, if a blob is not detected in the averaged range-Doppler map by the blob detector, the radar detector is indicated by the blob detector to be blocked.

In some exemplary embodiments, a blob in the averaged range-Doppler map is considered by the blob detector to be due to radar returns from an extended object which is stationary with respect to a ground surface in the environment in which the automotive radar system is operating. In some exemplary embodiments, the extended object is a surface of a road on which the host vehicle is traveling. In some exemplary embodiments, the extended object is a curb along a side of a road on which the host vehicle is traveling.

In some exemplary embodiments, the plurality of range-Doppler maps comprise 150 range-Doppler maps.

In some exemplary embodiments, the radar signals have a frequency of approximately 77 GHz.

In some exemplary embodiments, for each data point in the averaged range-Doppler map, the blob detector compares a value of the data point with a first threshold value. In some exemplary embodiments, if the value of the data point exceeds the first threshold, the blob detector compares values of a plurality of neighboring data points in the averaged range-Doppler map to a second threshold value. In some exemplary embodiments, if the values of the neighboring data points exceed the second threshold value, then the blob detector identifies the data point as a point in a blob. In some exemplary embodiments, if a quantity of neighboring data points identified as points in a blob exceeds a predetermined threshold, then the blob detector determines that the neighboring data points constitute a blob.

In some exemplary embodiments, the blob detector ceases analyzing data points in the averaged range-Doppler map if the radar system detects an object in the region.

According to another aspect, a method of processing in a movable radar system is provided. The method includes: transmitting a plurality of radar signals into a region; detecting reflected radar signals and converting the reflected radar signals into digital data signals; generating from the digital data signals a plurality of range-Doppler maps for the region; averaging the plurality of range-Doppler maps to generate an averaged range-Doppler map for the region; analyzing data points in the averaged range-Doppler map to detect blobs in the averaged range Doppler map; and, if a blob is detected in the averaged range-Doppler map, indicating the radar detector to be unblocked.

In some exemplary embodiments, if a blob is not detected in the averaged range-Doppler map, the radar detector is indicated to be blocked.

In some exemplary embodiments, a blob in the averaged range-Doppler map is considered to be due to radar returns from an extended object which is stationary with respect to a ground surface in the environment in which the automotive radar system is operating. In some exemplary embodiments, the extended object is a surface of a road on which the host vehicle is traveling. In some exemplary embodiments, the extended object is a curb along a side of a road on which the host vehicle is traveling.

In some exemplary embodiments, the plurality of range-Doppler maps comprise 150 range-Doppler maps.

In some exemplary embodiments, the radar signals have a frequency of approximately 77 GHz.

In some exemplary embodiments, for each data point in the averaged range-Doppler map, a value of the data point is compared with a first threshold value. In some exemplary embodiments, if the value of the data point exceeds the first threshold, values of a plurality of neighboring data points in the averaged range-Doppler map are compared to a second threshold value. In some exemplary embodiments, if the values of the neighboring data points exceed the second threshold value, then the data point is identified as a point in a blob. In some exemplary embodiments, if a quantity of neighboring data points identified as points in a blob exceeds a predetermined threshold, then the neighboring data points are determined to constitute a blob.

In some exemplary embodiments, analyzing data points in the averaged range-Doppler map is stopped if an object is detected in the region.

According to the exemplary embodiments, certain advantages are realized. For example, because the approach of the invention performs sensor blockage detection processing only where object detections are absent, and because sensor blockage detection processing is terminated and normal object detection processing resumes if object detections return, substantially reduced processing time and resource usage are substantially reduced. Also, because of the normalization and averaging of multiple RD maps to generate the averaged RD map, and the use of blob detection, the approach of the present disclosure provides detection of the road, even in the presence of very weak radar reflections from the road. This greatly improves the accuracy of the blockage detection and reporting of the approach of the present disclosure.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

FIGS. 9A and 9B include pseudocode with descriptive annotations for the functions that build the averaged RD map, according to some exemplary embodiments.

FIG. 10 includes pseudocode with descriptive annotations for the function that computes the decision metric, also referred to as the "SM Metric," based on blob detection, according to some exemplary embodiments.

FIG. 11 includes pseudocode with descriptive annotations for blob detection functions, according to some exemplary embodiments.

FIGS. 12A and 12B include pseudocode with descriptive annotations for additional blob detection functions, according to some exemplary embodiments.

FIGS. 13A, 13B and 13C include pseudocode with descriptive annotations for functions for updating the decision metric and making blocked or clear determinations and declarations, according to some exemplary embodiments.

DETAILED DESCRIPTION

Automotive radar is designed for active safety, and to provide a continuous level of safety, the radar must be able to detect if it is functioning according to specifications. If the radar is blocked by mud or snow or other obscurants, then the radar performance may be significantly degraded, and the user should be alerted. In some configurations, it would be desirable to include a secondary radar sensor dedicated to monitoring the physical state of the primary radar. However, due to considerations of cost and physical space, this approach is considered impractical. Therefore, according to the present disclosure, the radar system itself is configured to detect whether it is blocked and to report blockage to the user/operator. According to the present disclosure, an approach to detecting blockage, concluding whether the radar is blocked or unblocked, and reporting radar sensor blockage is described in detail. Experimental results from the described approach are also included. It should be noted that the exemplary radar system claimed and described in detail herein has a central frequency of approximately 77 GHz with an elevation beam width of approximately 14° FWHM (full-width half-maximum). In some exemplary embodiments, the radar sensor is typically mounted about 0.5 m above the road.

Figure 1:
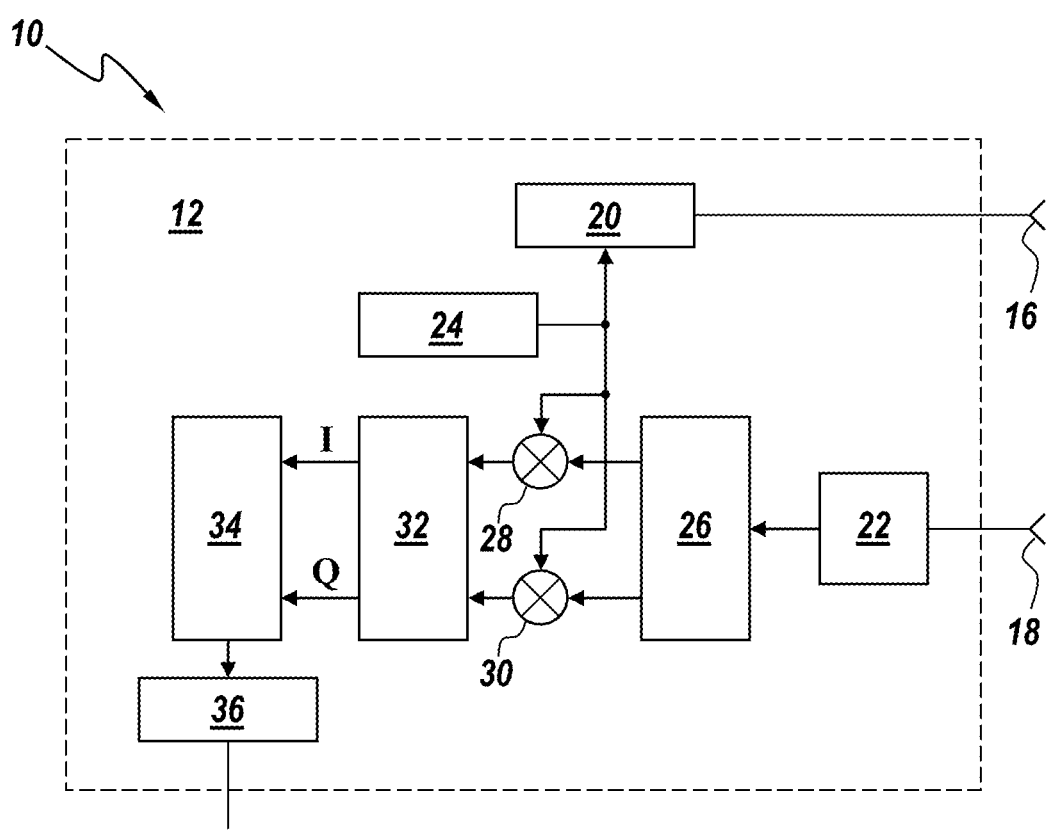
FIG. 1 includes a schematic block diagram of an automotive radar sensor module for processing automotive radar signals, in accordance with some exemplary embodiments.

FIG. 1 includes a schematic block diagram of an automotive radar sensor module 10 for processing automobile radar signals, in accordance with some exemplary embodiments. Referring to FIG. 1, system 10 includes a radar module 12, which processes radar transmit and receive signals which are compatible with the radar detection and monitoring system in the host automobile. Radar module 12 generates and transmits radar signals into the region adjacent to the host vehicle that is being monitored by the radar system. Generation and transmission of signals is accomplished by RF signal generator 24, radar transmit circuitry 20 and transmit antenna 16. Radar transmit circuitry 20 generally includes any circuitry required to generate the signals transmitted via transmit antenna 16, such as pulse shaping circuitry, transmit trigger circuitry, RF switch circuitry, or any other appropriate transmit circuitry used by the radar system.

Radar module 12 also receives returning radar signals at radar receive circuitry 22 via receive antenna 18. Radar receive circuitry 22 generally includes any circuitry required to process the signals received via receive antenna 18, such as pulse shaping circuitry, receive trigger circuitry, RF switch circuitry, or any other appropriate receive circuitry used by the radar system. The received signals processed by radar receive circuitry 22 are forwarded to phase shifter circuitry 26, which generates two signals having a predetermined phase difference. These two signals, referred to as an inphase (I) signal and a quadrature (Q) signal, are mixed with an RF signal from RF signal generator 24 by mixers 28 and 30, respectively. The resulting difference signals are further filtered as required by filtering circuitry 32 to generate baseband I and Q signals, labeled "I" and "Q" in FIG. 1. The baseband I and Q signals are digitized by analog-to-digital converter circuitry (ADC) 34.

In automobile radar systems, these digitized I and Q baseband signals are processed by a processor 36, which can include such circuitry as a digital signal processor (DSP), associated memory, associated I/O circuitry, communication bus circuitry, and any other circuitry required for carrying out any processing functions of system 10 and/or radar sensor 12. In some exemplary embodiments, the processor 36 can perform processing such as a Fast Fourier Transform (FFT) to generate a plurality of Doppler range bins processed according to the detailed description herein to identify when the sensor is blocked. That is, the FFT can be used to generate a range-Doppler (RD) map of the region around the automobile being monitored by radar system 10. That RD map is processed by, for example, processor 36, according to the approach described herein in detail to detect and report blockage of radar sensor 12.

According to the present disclosure, radar system 10 determines whether system 10 is detecting other automobiles and stationary objects in the region being monitored. If the radar is detecting automobiles and stationary objects, e.g., poles, guardrails, etc., then the blockage state may be set to unblocked or clear. However, the converse is not necessarily true. That is, if the radar is not detecting targets, it cannot necessarily be concluded that the radar is blocked. Instead, it is considered that the automobile could be in the desert scenario where there are no targets. It should be noted that, according to the present disclosure, the term "desert" refers to a region having few or no radar targets. This may include an actual desert, or it may also include other regions such as a large parking lot with no features, a large snow-covered area, or other such region.

Figure 2:
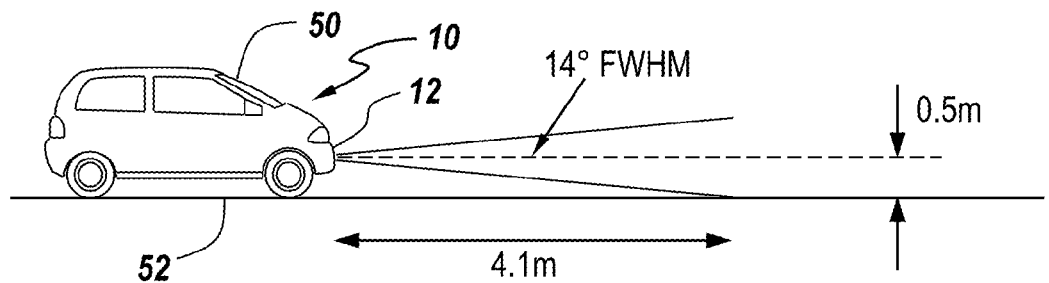
FIG. 2 includes a schematic diagram of a host automobile 50 equipped with radar system 10 of the present disclosure, according to some exemplary embodiments.

According to the present disclosure, it is recognized that, even in the desert scenario, without other automobiles or other targets, the road will always be present. Accordingly, the system of the disclosure detects the presence of the road. In general, the radar return from the road can be quite weak. FIG. 2 includes a schematic diagram of a host automobile 50 equipped with radar system 10 of the present disclosure, according to some exemplary embodiments. Referring to FIG. 2, radar system 10 includes at least one radar sensor 12 mounted to host automobile 50. As illustrated in FIG. 2, in some exemplary embodiments, radar sensor 12 is mounted on host automobile 50 approximately 0.5 meter above road surface 52, on which host automobile 50 is traveling. The radar beam transmitted by radar sensor 12 strikes road surface 52 at a relatively low angle, for example, as illustrated in FIG. 2, at an angle of approximately seven (7) degrees. As a result, the radar beam strikes the road at, for example, a distance of approximately 4.1 meters in front of radar sensor 12, and the radar return from road surface 52 is far less than if the radar were incident on the road at a larger angle. As a result, road surface 52 is difficult to detect during normal radar object detection processing. According to some exemplary embodiments, in the event of a drop in object detections, an approach is employed to detect road surface 52 to distinguish between the desert scenario in which object detections are normally low or absent, and a situation in which radar sensor 12 is blocked. It will be understood that the angles and distances illustrated in FIG. 2 are exemplary illustrations to aid with detailed description of the exemplary embodiments.

Figure 3:
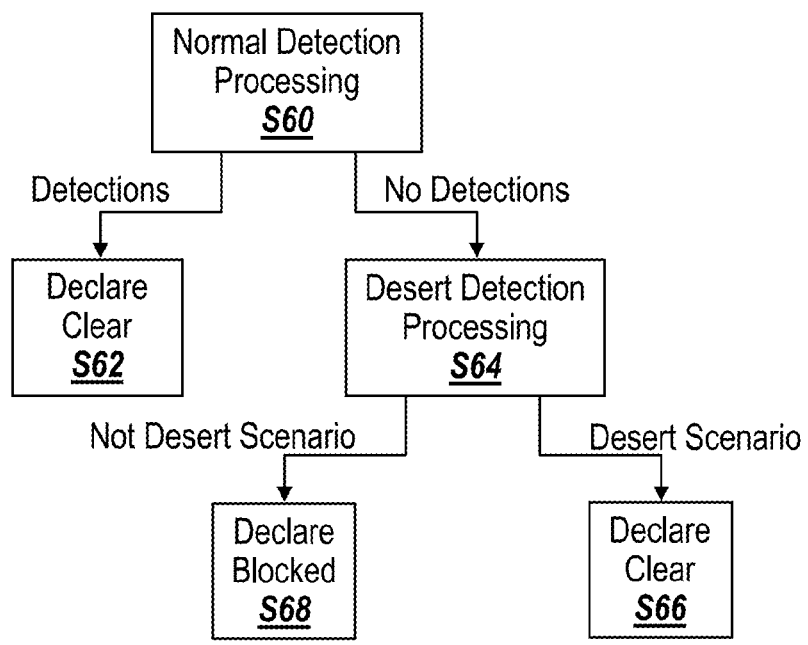
FIG. 3 includes a logical flow diagram of an approach to automotive radar processing with sensor blockage detection, according to some exemplary embodiments.

FIG. 3 includes a logical flow diagram of an approach to automotive radar processing with sensor blockage detection, according to some exemplary embodiments. Referring to FIG. 3, under normal operation of radar system 10, object detections are processed in step S60. Where object detections are present, radar sensor 12 is declared clear, as illustrated in step S62. On the other hand, where no detections are present, additional desert detection processing is performed, as illustrated in step S64. Desert detection processing S64 is performed to distinguish between a normally operating radar sensor 12 in the desert scenario, i.e., no object detections, and a radar sensor 12 that is blocked. If desert detection processing S64 determines that the desert scenario is present, then radar sensor 12 is declared clear in step S66. On the other hand, if desert detection processing S64 determines that the desert scenario is not present, then radar sensor 12 is declared blocked in step S68.

As described above, even in the desert scenario, road surface 52 is assumed to be present. In contrast, in the blocked scenario, nothing will be detected, including road surface 52. That is, in the blocked scenario, road surface 52 will not be present in detections. Thus, according to exemplary embodiments, desert detection processing S64 distinguishes the desert scenario from the blocked scenario by detecting the presence of road surface 52. As noted above, the radar reflection from road surface 52 may be weak, and, therefore, difficult to detect, since the radar beam is incident on road surface 52 at a small, grazing angle. Nevertheless, according to the exemplary embodiments, an approach is applied to detect the weak reflection from road surface 52 to enable radar sensor 12 to be declared clear or blocked.

According to exemplary embodiments, the desert detection processing S64 involves at least two parts. The first involves averaging of multiple range-Doppler maps for the region being monitored, which results in improved signal-to-noise ratio (SNR). The second part involves processing the averaged RD map to identify road surface 52 in the averaged RD map data. This second part can include performing blob detection to identify road surface 52.

According to exemplary embodiments, radar sensor 12 transmits 64 Doppler pulses in a dwell. It will be understood that the choice of 64 pulses per dwell is exemplary only and is not critical to the disclosure. From a single dwell of 64 pulses, a single range-Doppler (RD) map is generated. The RD map is typically a two-dimensional matrix that contains the complex amplitude as a function of range and Doppler. The complex RD map is a representation of the radar return for the region being observed. Objects or targets, such as other automobiles or poles, typically appear as peaks in the RD map. In the absence of objects or targets, the RD map will appear as a noisy region. To remove the effect of range, according to some exemplary embodiments, each range bin is normalized by a median calculation such that the median value is 1. In some exemplary embodiments, the median calculation is performed across all valid Doppler bins for each valid range bin. The complex RD map for dwell n is denoted herein as $RD_n$. Multiple dwells, having a quantity denoted herein by N, are performed to generate multiple, i.e., N, RD maps. Then, the averaged RD map is generated by summing the absolute value of the N individual RD maps:

$$RD = \Sigma_{n=1}^{N} |RD_n| \qquad (1)$$

According to the disclosure, the average RD map is generated over many, i.e., N, cycles, to allow faint features such as road surface 52 to be detected. The value of N may be chosen empirically. In some exemplary embodiments, it was determined that N=150 gave good results. In the particular exemplary embodiments, the radar acquires an RD map every 40 ms, so that 150 cycles corresponds to an acquisition time of approximately six (6) seconds. It will be understood that other numbers N of cycles can be used. N=150 is just one particular exemplary embodiment. With respect to equation (1) above, even though host automobile 50 may be moving, radar returns of ground features such as a curb on the side of the road or road surface 52 in front of the car will remain relatively constant over short periods of time. The complex phase may vary randomly, so the absolute value is used in equation (1). It is noted that such an averaging technique would not work for targets such as other automobiles or singular stationary objects such as poles, since they would rapidly move through different points in the RD map.

Figure 4A:
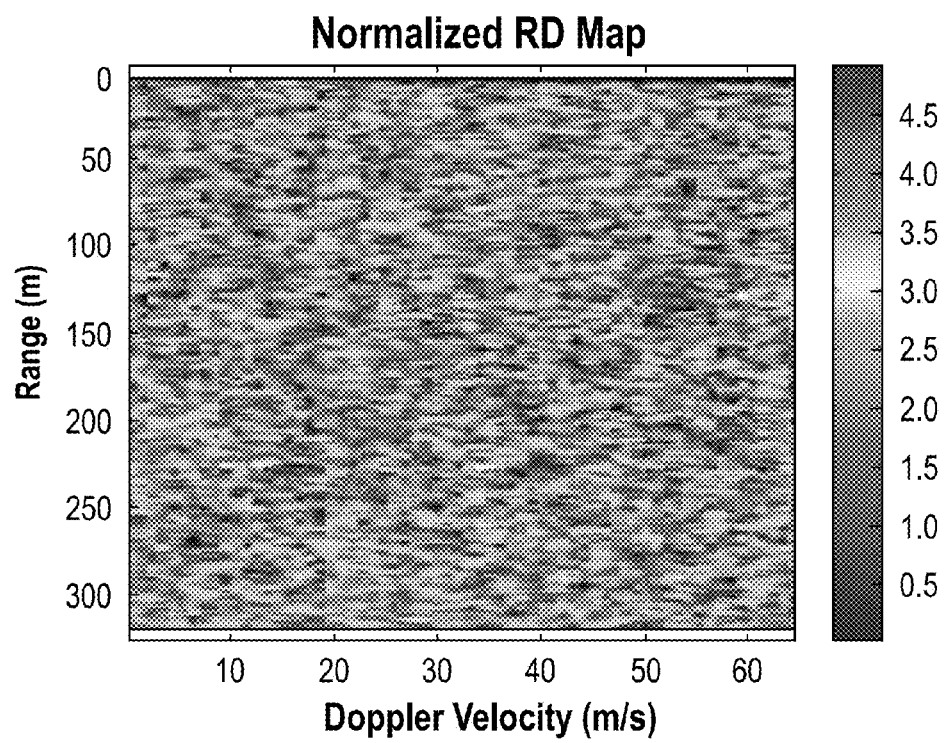
FIG. 4A includes an image of a single RD map for a region being observed by radar sensor 12, for a single dwell, according to some exemplary embodiments.

FIG. 4A includes an image of a single RD map for a region being observed by radar sensor 12, for a single dwell, according to some exemplary embodiments. The data for this map was acquired at a large vacant lot with few or no targets. This lot was chosen for illustration purposes because it represents the most difficult desert case. It should be noted that, in FIG. 4A, the first five (5) range bins have been masked out. Also, the first 50 range bins at low and high Doppler have been masked out. These regions are masked to cut out the signal from the fascia (bumper) of host automobile 50. In this particular illustration, and in some automotive radar applications, radar sensor 12 is mounted behind the fascia, and the fascia typically introduces large returns that are much higher than the weak detections from road surface 52, so to illustrate the features of the present disclosure, the RD maps do not reflect these regions. Thus, an important advantage of using the RD maps according to the present disclosure is that masking out unwanted irrelevant returns, such as those of the fascia, is straightforward.

Figure 4B:
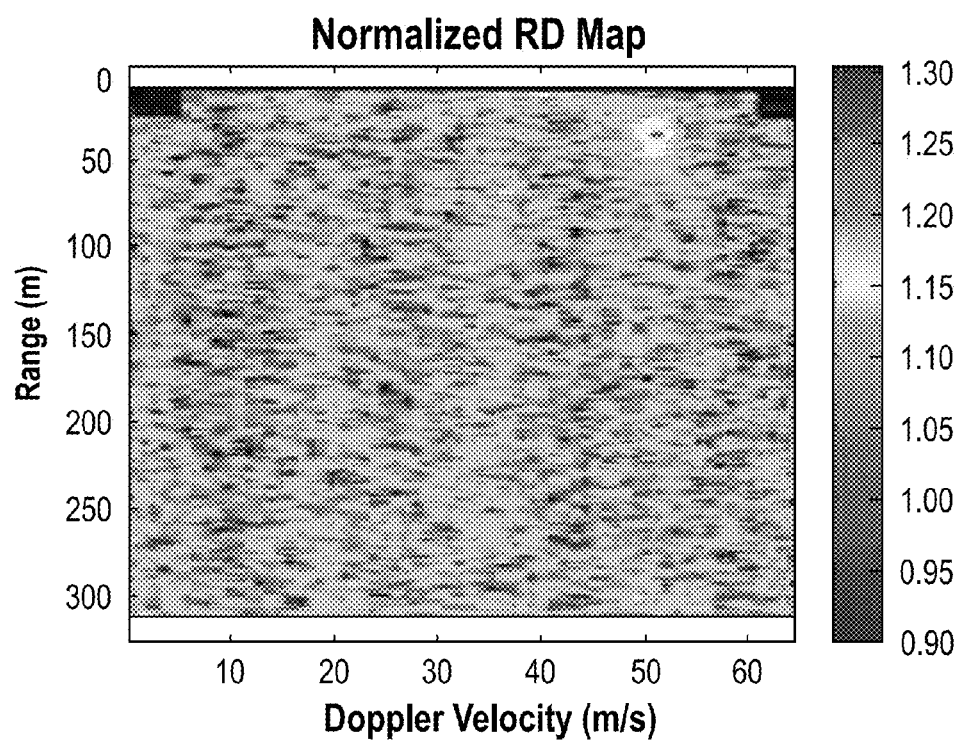
FIG. 4B includes an image of an averaged RD map computed from multiple RD maps exemplified by FIG. 4A, for multiple dwells, according to equation (1), according to some exemplary embodiments.

FIG. 4B includes an image of an averaged RD map computed from multiple RD maps exemplified by FIG. 4A, for multiple dwells, according to equation (1), according to some exemplary embodiments. Specifically, the RD map in FIG. 4B is an average of N=150 cycles. Also, radar sensor 12 was not blocked and host automobile 50 was moving along road surface 52 at approximately 13 meters per second (mps). Referring to FIG. 4B, it can be seen that the road features are more apparent in the single RD map of FIG. 4A than in the averaged RD map of FIG. 4B. In FIG. 4B, while targets such as cars and poles appear as narrow peaks in the RD map, the road tends to appear as a blob-like shape, as shown near the upper right corner of the map in FIG. 4B.

It is noted that in FIG. 4B, the blob shape is substantially elliptical. The reason for the Doppler extent is that the beams have a wide angular extent of 45°. The ground Doppler velocity $v_D$ is given by $v_D=v_0 \cos(\theta)$, where $\theta$ is the azimuthal angle of the ground or road surface 52 relative to the host automobile's 50 velocity vector ($\theta=0$ being straight ahead of host automobile 50). The extent of the blob in range is attributed to the topology of the ground or road surface 52, or that the radar beam becomes closer to parallel with the ground or road surface 52, as range increases, which would decrease the amplitude of the radar return. That is, details of ground topology can affect where the reflection occurs in range/angle. It is expected that the peak reflection would be at close range because the incidence angle is highest. The blob spreads in Doppler because the beam shape is as wide as 45 degrees. Thus, in this particular exemplary illustration, the ground Doppler velocity may vary from 13 mps to 13 $\cos(45)=9.2$ mps.

Figure 5A:
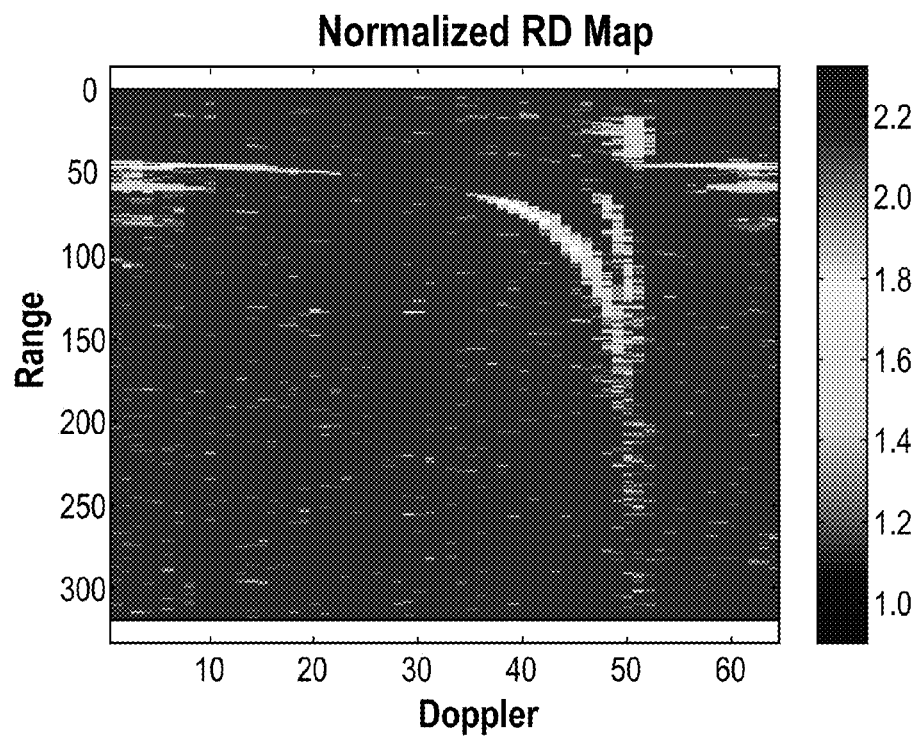
FIGS. 5A, 5B and 5C illustrate additional averaged RD maps for cases in which radar sensor 12 is unblocked or clear, according to some exemplary embodiments.
Figure 5B:
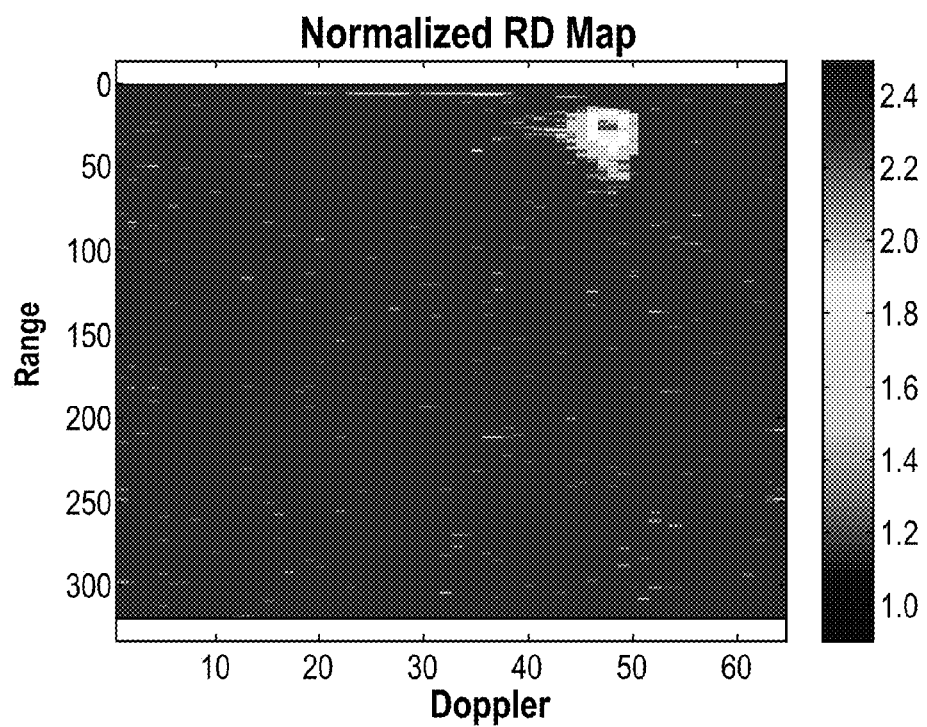
Figure 5C:
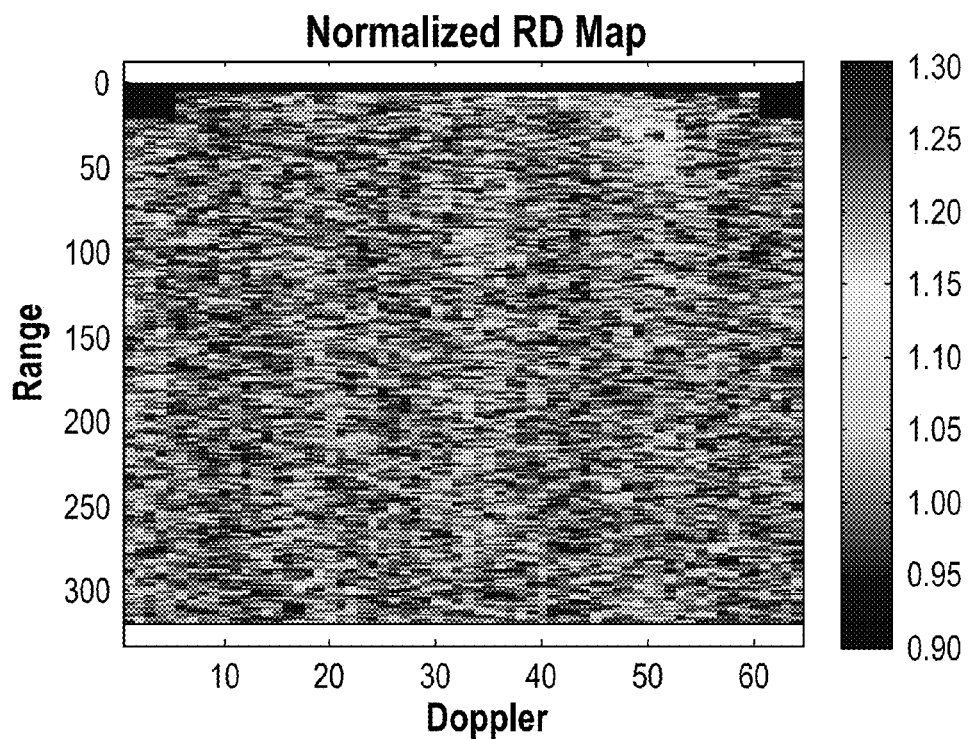

FIGS. 5A, 5B and 5C illustrate additional averaged RD maps for cases in which radar sensor 12 is unblocked or clear, according to some exemplary embodiments. FIG. 5A shows the radar return from a curb or an interface between road and grass. Looking along the curb, the angle changes. As a result, the blob has a curved shape, again because the Doppler velocity is a function of angle. FIG. 5B illustrates a clearly visible elliptical blob. It should be noted that the blob of FIG. 5B could arise from refection from pavement behind host automobile 50. FIG. 5C illustrates a RD map with a visible blob. However, the values in the blob are not much higher than the noise level. This is the most difficult case in that distinguishing the blob from background noise is more of a challenge.

Figure 6:
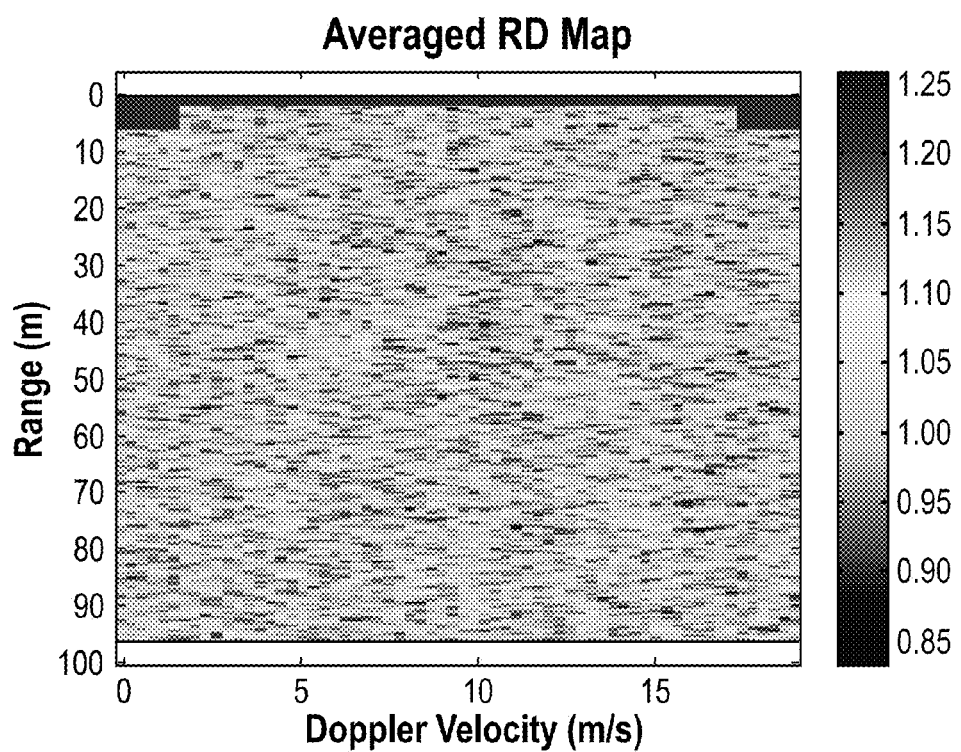
FIG. 6 illustrates a typical RD map when radar sensor 12 is blocked, according to some exemplary embodiments.

FIG. 6 illustrates a typical RD map when radar sensor 12 is blocked, according to some exemplary embodiments. Referring to FIG. 6, the RD map produced from a blocked radar sensor 12 includes "salt-and-pepper" noise, as illustrated, and no blob-like shapes.

FIG. 6 illustrates some issues with discriminating between blocked and unblocked sensor states. First, the peak amplitude from the blocked case is similar to the peak amplitude of the unblocked case illustrated, for example, in FIG. 4B. As a result, the detection technique of the present disclosure is not solely based on peak amplitude. The detection technique described in detail below addresses the peak amplitude issue by looking for blobs, not peaks. Second, the detection technique described in detail herein is very sensitive to low-energy returns. If any radar energy leaks through the sensor blockage, the technique may detect a return and declare the clear state. This indicates that the blocked and clear states overlap somewhat. In response, in some exemplary embodiments, the technique of the present disclosure is designed to err on the side of being hard to block rather than declaring false blockage.

The approach of the present disclosure for using the RD map such as that in FIG. 4A to declare either the blockage or clear state is now described in detail. As noted above, the road typically appears as a blob in the RD map. As used herein, the term "blob" refers to a group of points in the averaged RD map that differ in properties, such as intensity of radar return signal, from that of surrounding points. As described below in detail, in general, a predetermined quantity of neighboring points having radar returns above a certain predetermined value is defined as a blob. According to the exemplary embodiments, a blob detection technique based on Lindeberg's watershed-based grey-level blob detection algorithm is used. It is noted that blob detection is a well-known technique in vision processing. The details of blob detection will not be reproduced here for the sake of clarity of the detailed description herein.

According to the present disclosure, the averaged RD map is first generated as described in detail above by averaging RD maps of a plurality N of cycles. As described above, in some exemplary embodiments, N=150. In accordance with the blob detection approach, in some exemplary embodiments, two different thresholds are set. The two thresholds are referred to herein as Threshold A or a "seed-creation threshold" and Threshold B or a "seed-verification threshold." Next, the technique steps through all points in the averaged RD map. If the current point value exceeds Threshold A and the point values of three neighbor points to the current point exceed Threshold B, then the current point is accepted as a seed point. Next, to determine the extent of the blob and to identify each point in the blob, each nearest neighbor of the seed point is checked to see whether its value exceeds Threshold A. If so, and if the point values for all of its three nearest neighbors exceed Threshold B then that point is identified as a blob member. Then, each neighbor of the identified blob member is similarly checked. This process continues until no neighbors are found with point values exceeding Threshold A. The blob is then considered complete.

The technique also sets a minimum blob-size threshold or number of points required for a blob to be considered valid. That threshold number of points is referred to herein as NumBlob. If the identified blob has at least that number of points, then the group of points is concluded to be an admissible blob, which could be due to radar returns from road surface 52. Next, the values of all points in the blob are added to generate a decision metric, described below in more detail. If the decision metric exceeds a minimum threshold, referred to herein as MetricThresh, then it is concluded that the blob is in fact due to radar returns from road surface 52, and that the system is operating in the desert scenario, and the present set of cycles is declared unblocked or cleared (see step S66 in FIG. 3). If after checking all points in the RD map, no admissible blobs can be identified, then it is concluded that the system in not operating in the desert scenario, and the present set of cycles can be declared blocked (see step S68 in FIG. 3).

According to some exemplary embodiments, the technique has several parameters which were optimized during testing, and these parameters can also change dynamically based on the system state. For example, when host automobile 50 is moving, the blobs are much wider in Doppler than they are when host automobile 50 is stationary. Therefore, according to some exemplary embodiments, the thresholds and/or the minimum number of points per blob are adjusted depending on the velocity of host automobile 50. The blob detection technique of the disclosure is very effective at identifying blobs even when their peak amplitude in the averaged RD map is only slightly higher than the noise level.

Figure 7A:
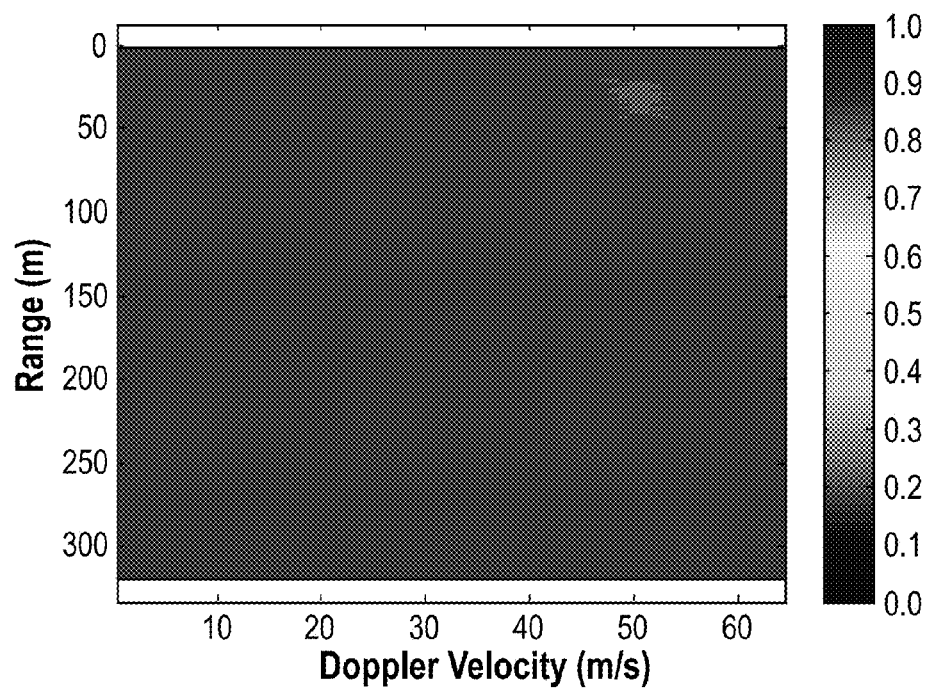
FIGS. 7A, 7B and 7C are images of the blobs identified by the technique of the present disclosure, applied to the averaged RD maps of FIGS. 4B, 5A and 5B, respectively, according to some exemplary embodiments.
Figure 7B:
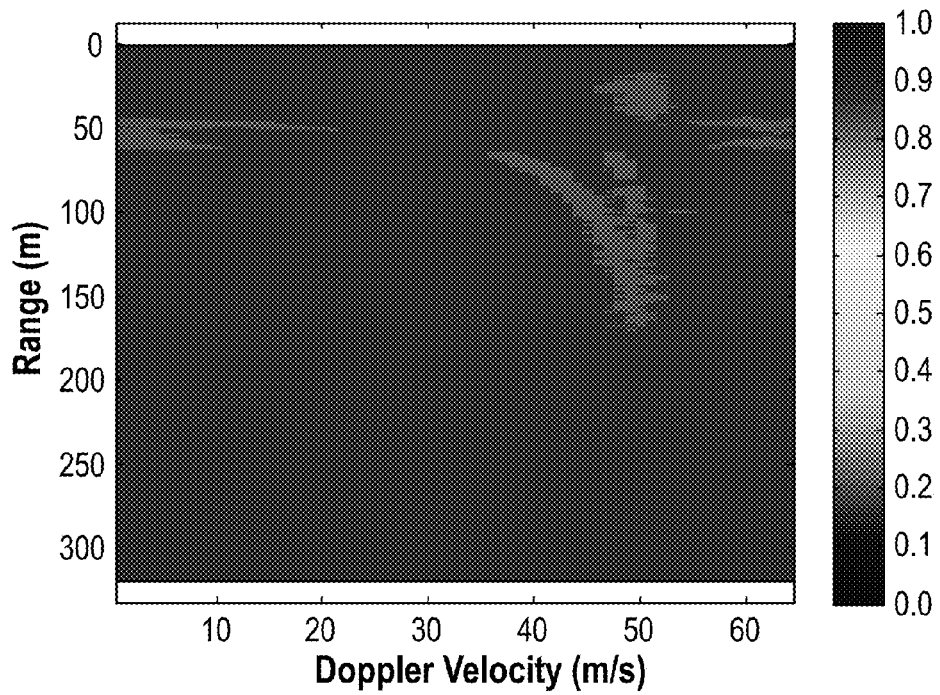
Figure 7C:
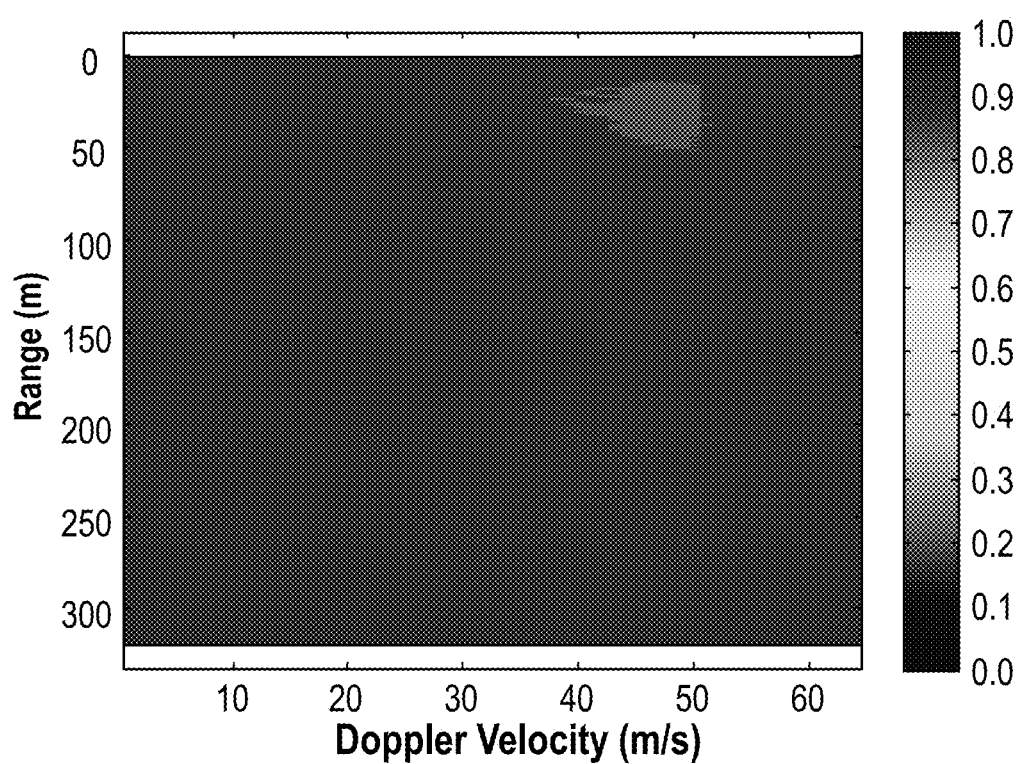

FIGS. 7A, 7B and 7C are images of the blobs identified by the technique of the present disclosure, applied to the averaged RD maps of FIGS. 4B, 5A and 5B, respectively, according to some exemplary embodiments. It is noted that, for the blocked data of FIG. 6, no blobs were detected.

As described above, for each set of N cycles, e.g., 150 cycles, a single RD Map is generated, and then the detection technique is performed to generate a single decision metric. In some exemplary embodiments, the decision metric is the sum of the values of all points that are contained within a blob. If the metric is higher than a threshold MetricThresh, the set of cycles is declared to be clear. Otherwise, the set of cycles is declared to be blocked. In some exemplary embodiments, if over a time period of a predetermined number of sets, for example, 10 sets, of N, e.g., 150, cycles, a certain number of sets is blocked, then the radar sensor 12 is declared to be blocked. An alert is then issued to the user/operator, such as by an audible alert and/or visual message that radar sensor 12 is blocked and should be cleared before operating further. For example, if 6/10 sets are blocked, then radar sensor 12 is declared to be blocked. In this particular exemplary configuration, each set of 150 cycles takes 6 seconds to acquire and process, and so radar sensor 12 will report blockage in approximately one minute.

According to some exemplary embodiments, once a seed point is established in the blob detection technique, the clutter-blob search spreads across the averaged RD map adding more cells at a lower threshold. Since velocity of host automobile 50 directly affects the shape and magnitude of the blob, in some exemplary embodiments, different speed states are used to determine how the clutter blob is expected to spread once the seed has been established. Slow speed state is used when host automobile 50 is stopped or moving slowly; minimal blob spreading is expected. High speed state is used when host automobile 50 is moving more rapidly; blobs are allowed to span more cells and skip sub-threshold cells. Thus, according to these exemplary embodiments, a speed sensor which detects speed of host automobile 50 is mounted in host automobile 50 and is used by the system and technique of the disclosure to detect blockage of radar sensor 12. Checks on execution time are made at several levels to spread processing out and abort detection if necessary. Thus, the blob detection of the disclosure allows for detection of blobs even if the blobs have low peak amplitudes.

Figure 8:
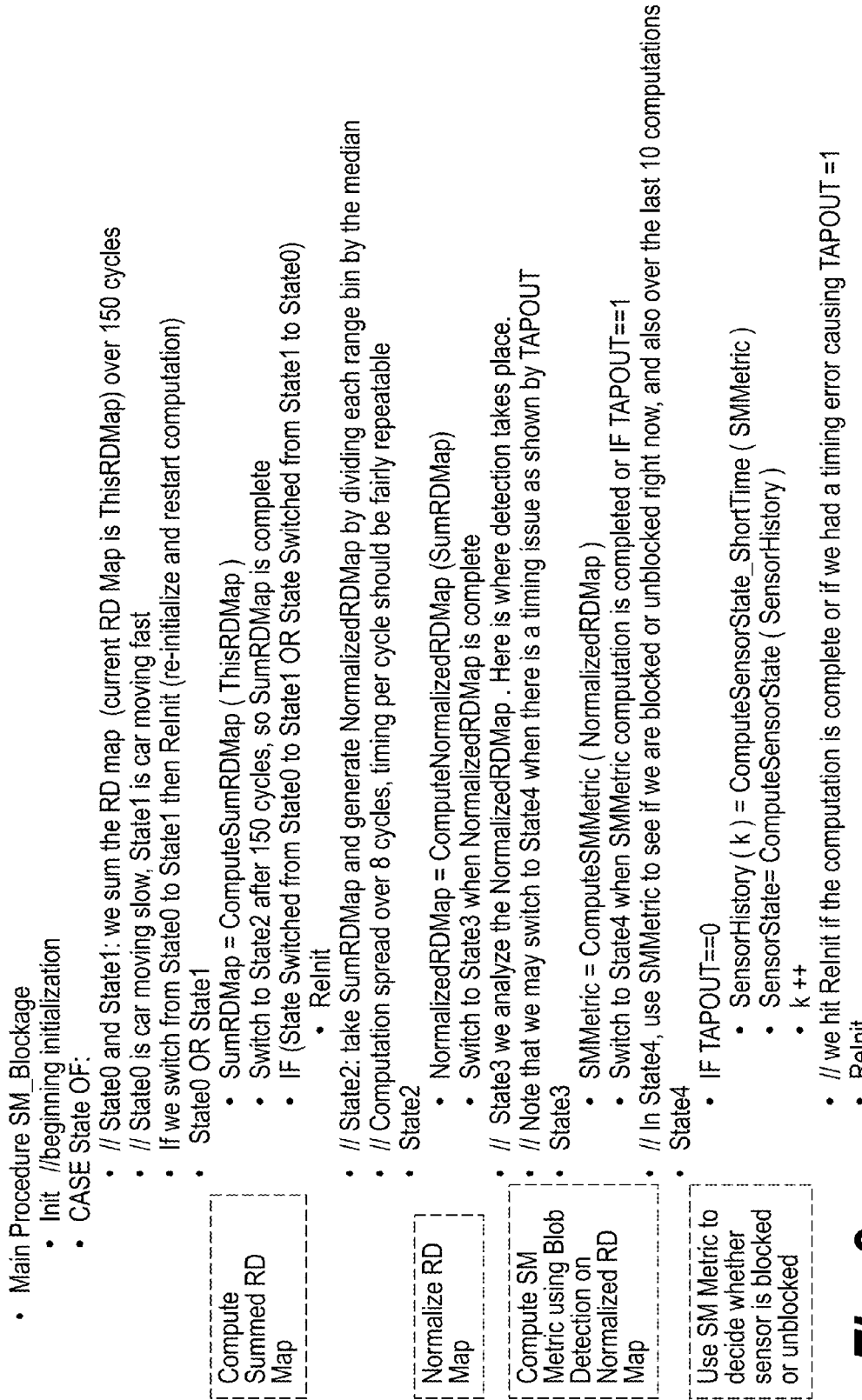
FIG. 8 includes pseudocode with descriptive annotations for the main procedure of the technique for detecting radar sensor blockage, according to some exemplary embodiments.

As described above, the technique of the present disclosure can be carried out by processor 36 executing a series of executable instructions stored in memory in radar sensor 12 (see FIG. 1). FIGS. 8, 9A, 9B, 10, 11, 12A, 12B, 13A, 13B and 13C include pseudocode with descriptive annotations for the executable instructions carried out by processor 36 and associated circuitry in radar sensor 12 to implement the techniques of the present disclosure, according to exemplary embodiments. FIG. 8 includes pseudocode with descriptive annotations for the main procedure of the technique for detecting radar sensor blockage, according to some exemplary embodiments. FIGS. 9A and 9B include pseudocode with descriptive annotations for the functions that build the averaged RD map, according to some exemplary embodiments. FIG. 10 includes pseudocode with descriptive annotations for the function that computes the decision metric, also referred to as the "SM Metric," based on blob detection, according to some exemplary embodiments. FIG. 11 includes pseudocode with descriptive annotations for blob detection functions, according to some exemplary embodiments. FIGS. 12A and 12B include pseudocode with descriptive annotations for additional blob detection functions, according to some exemplary embodiments. FIGS. 13A, 13B and 13C include pseudocode with descriptive annotations for functions for updating the decision metric and making blocked or clear determinations and declarations, according to some exemplary embodiments.

According to some particular exemplary embodiments, certain predetermined parameters are defined. It should be noted that these parameters should not be considered to limit the scope of the present disclosure, but rather, are provided as exemplary illustrations to enhance the understanding of the disclosure. Foe example, as noted above, the number N of frames or RD maps used to reveal low-energy returns, such as returns from the road surface, in some particular exemplary embodiments is 150. In some exemplary embodiments, Threshold A, i.e., the amount by which a peak point value should exceed other values in order to be considered a peak, can be approximately 1.5 dB. In some exemplary embodiments, the decision threshold MetricThresh, i.e., the threshold value used to determine whether the decision metric or SM Metric used to indicate whether a set of points should be declared clear or blocked, can be approximately 5 dB. In some exemplary embodiments, to avoid returns due to the bumper fascia, the range-Doppler mask may be defined to ignore the first 12 range bins. The mask may be further defined to ignore range bins 1-70 with Doppler <0-5 or Doppler 59-64.

Referring to FIG. 3 and the foregoing detailed description, according to some exemplary embodiments, desert detection processing S64 can performed only if no detections are present. That is, under normal circumstances, normal object detection processing S60 is performed without desert detection processing S64 of the disclosure to identify sensor blockage. Furthermore, even during desert detection processing, if detections return, then processing returns to normal detection processing. According to some exemplary embodiments, the processing of multiple RD maps to normalize and compute the averaged RD map and/or the blob detection processing described in detail above is not carried out unless detections are absent. Therefore, because this processing is only performed when needed, i.e., in the absence of object detections, and is not running continuously, the approach of the disclosure realizes significantly reduced processing time and resource use, compared to an approach in which blockage detection and processing is being performed continuously.

According to the exemplary embodiments, certain advantages are realized. For example, because the approach of the invention performs sensor blockage detection processing only where object detections are absent, and because sensor blockage detection processing is terminated and normal object detection processing resumes if object detections return, substantially reduced processing time and resource usage are substantially reduced. Also, because of the normalization and averaging of multiple RD maps to generate the averaged RD map, and the use of blob detection, the approach of the present disclosure provides detection of the road, even in the presence of very weak radar reflections from the road. This greatly improves the accuracy of the blockage detection and reporting of the approach of the present disclosure. Also, the approach of the present disclosure works whether or not the host vehicle is in motion.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. An automotive radar system, comprising:
   a radar transmitter for transmitting a plurality of radar signals into a region;
   a radar detector for detecting reflected radar signals and converting the reflected radar signals into digital data signals; and
   a processor that receives the digital data signals, generates a plurality of range-Doppler maps for the region over time and averages the plurality of range-Doppler maps to generate an averaged range-Doppler map for the region; wherein
   the processor analyzes data points in the averaged range-Doppler map to detect blobs in the averaged range Doppler map; and wherein
   if a blob is detected in the averaged range-Doppler map by the processor, the radar detector is indicated by the processor to be unblocked.

2. The automotive radar system of claim 1, wherein, if a blob is not detected in the averaged range-Doppler map by the processor, the radar detector is indicated by the processor to be blocked.

3. The automotive radar system of claim 1, wherein a blob in the averaged range-Doppler map is considered by the processor to be due to radar returns from an extended object which is stationary with respect to a ground surface in an environment in which the automotive radar system is operating.

4. The automotive radar system of claim 3, wherein the extended object is a surface of a road on which the host vehicle is traveling.

5. The automotive radar system of claim 3, wherein the extended object is a curb along a side of a road on which the host vehicle is traveling.

6. The automotive radar system of claim 1, wherein the plurality of range-Doppler maps comprise 150 range-Doppler maps.

7. The automotive radar system of claim 1, wherein the radar signals have a frequency of approximately 77 GHz.

8. The automotive radar system of claim 1, wherein, for each data point in the averaged range-Doppler map, the processor compares a value of the data point with a first threshold value.

9. The automotive radar system of claim 8, wherein, if the value of the data point exceeds the first threshold, the processor compares values of a plurality of neighboring data points in the averaged range-Doppler map to a second threshold value.

10. The automotive radar system of claim 9, wherein, if the values of the neighboring data points exceed the second threshold value, then the processor identifies the data point as a point in a blob.

11. The automotive radar system of claim 10, wherein, if a quantity of neighboring data points identified as points in a blob exceeds a predetermined threshold, then the processor determines that the neighboring data points constitute a blob.

12. The automotive radar system of claim 1, wherein the processor ceases analyzing data points in the averaged range-Doppler map if the radar system detects an object in the region that is unrelated to any blob detected in the averaged range-Doppler map.

13. A method of processing in an automotive radar system, the method comprising:
   transmitting a plurality of radar signals into a region;
   detecting reflected radar signals and converting the reflected radar signals into digital data signals;
   generating from the digital data signals a plurality of range-Doppler maps for the region over time;
   averaging the plurality of range-Doppler maps to generate an averaged range-Doppler map for the region;
   analyzing data points in the averaged range-Doppler map to detect blobs in the averaged range Doppler map; and
   if a blob is detected in the averaged range-Doppler map, indicating the radar detector to be unblocked.

14. The method of claim 13, wherein, if a blob is not detected in the averaged range-Doppler map, the radar detector is indicated to be blocked.

15. The method of claim 13, wherein a blob in the averaged range-Doppler map is considered to be due to radar returns from an extended object which is stationary with respect to a ground surface in an environment in which the automotive radar system is operating.

16. The method of claim 15, wherein the extended object is a surface of a road on which the host vehicle is traveling.

17. The method of claim 15, wherein the extended object is a curb along a side of a road on which the host vehicle is traveling.

18. The method of claim 13, wherein the plurality of range-Doppler maps comprise 150 range-Doppler maps.

19. The method of claim 13, wherein the radar signals have a frequency of approximately 77 GHz.

20. The method of claim 13, wherein analyzing data points in the averaged range-Doppler map comprises, for each data point in the averaged range-Doppler map, comparing a value of the data point with a first threshold value.

21. The method of claim 20, wherein analyzing data points in the averaged range-Doppler map comprises, if the value of the data point exceeds the first threshold, comparing values of a plurality of neighboring data points in the averaged range-Doppler map to a second threshold value.

22. The method of claim 21, wherein analyzing data points in the averaged range-Doppler map comprises, if the values of the neighboring data points exceed the second threshold value, identifying the data point as a point in a blob.

23. The method of claim 22, wherein analyzing data points in the averaged range-Doppler map comprises, if a quantity of neighboring data points identified as points in a blob exceeds a predetermined threshold, determining the neighboring data points to constitute a blob.

24. The method of claim 13, wherein analyzing data points in the averaged range-Doppler map is stopped if an object that is unrelated to any blob detected in the averaged range-Doppler map is detected in the region.

* * * * *